(12) United States Patent
Bergman

(10) Patent No.: US 10,280,780 B2
(45) Date of Patent: May 7, 2019

(54) SEALING SYSTEMS FOR GAS TURBINE ENGINE VANE PLATFORMS

(71) Applicant: United Technologies Corporation, Farmington, CT (US)

(72) Inventor: Russell J. Bergman, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 563 days.

(21) Appl. No.: 14/928,147

(22) Filed: Oct. 30, 2015

(65) Prior Publication Data

US 2016/0123170 A1    May 5, 2016

Related U.S. Application Data

(60) Provisional application No. 62/072,706, filed on Oct. 30, 2014.

(51) Int. Cl.
*F01D 9/04* (2006.01)
*F01D 11/00* (2006.01)
(Continued)

(52) U.S. Cl.
CPC .............. *F01D 11/005* (2013.01); *F01D 9/02* (2013.01); *F01D 9/041* (2013.01); *F16J 15/022* (2013.01); *F05D 2220/32* (2013.01); *F05D 2230/10* (2013.01); *F05D 2230/60* (2013.01); *F05D 2240/12* (2013.01); *F05D 2240/55* (2013.01); *F05D 2240/80* (2013.01)

(58) Field of Classification Search
CPC . F01D 11/005; F01D 9/02; F01D 9/041; F16J 15/022; F05D 2240/80; F05D 2230/60; F05D 2230/10; F05D 2240/12; F05D 2240/55; F05D 2220/32
See application file for complete search history.

(56) References Cited

U.S. PATENT DOCUMENTS 3,860,358 A * 1/1975 Cavicchi ................ F01D 11/08
                                                           277/411
5,593,278 A    1/1997 Jourdain et al.
(Continued)

FOREIGN PATENT DOCUMENTS

EP    1749978 A2    2/2007
EP    2055899 A2    5/2009
GB    2471185 A    12/2010

OTHER PUBLICATIONS

European Search Report for Application No. 15192457.8-1610; dated Apr. 22, 2016; 8 pgs.

*Primary Examiner* — Eldon T Brockman
(74) *Attorney, Agent, or Firm* — Cantor Colburn LLP

(57) ABSTRACT

A sealing system for a turbomachine includes an annular seal defining a centerline axis and an inner diameter sealing surface. The sealing system also includes a turbomachine component radially inboard of the annular seal having a surface defined on an outer diameter surface. The sealing surface of the turbomachine component has a radius of curvature configured to be non-concentric with respect to the inner diameter surface of the annular seal in a cold state. The radius of curvature of the surface is configured to be substantially concentric with respect to the inner diameter surface of the annular seal in a hot state.

4 Claims, 3 Drawing Sheets

(51) Int. Cl.
*F16J 15/02* (2006.01)
*F01D 9/02* (2006.01)

(56) References Cited

U.S. PATENT DOCUMENTS

| | | | | |
|---|---|---|---|---|
| 7,207,771 | B2* | 4/2007 | Synnott | F01D 11/08 |
| | | | | 415/173.1 |
| 7,438,520 | B2* | 10/2008 | Ruthemeyer | F01D 11/08 |
| | | | | 415/135 |
| 7,442,004 | B2* | 10/2008 | Ruthemeyer | F01D 9/04 |
| | | | | 415/135 |
| 7,448,846 | B2* | 11/2008 | Ruthemeyer | F01D 11/12 |
| | | | | 415/135 |
| 7,452,183 | B2* | 11/2008 | Ruthemeyer | F01D 11/005 |
| | | | | 415/135 |
| 8,328,511 | B2* | 12/2012 | Hernandez Russe | F01D 9/041 |
| | | | | 415/209.2 |
| 8,641,371 | B2* | 2/2014 | Nakamura | F01D 11/18 |
| | | | | 415/139 |
| 2006/0083607 | A1* | 4/2006 | Synnott | F01D 11/08 |
| | | | | 415/173.1 |
| 2010/0247298 | A1* | 9/2010 | Nakamura | F01D 11/18 |
| | | | | 415/173.1 |
| 2010/0319352 | A1* | 12/2010 | Hernandez Russe | F01D 9/041 |
| | | | | 60/772 |
| 2011/0182721 | A1* | 7/2011 | Saunders | C01B 21/0682 |
| | | | | 415/173.7 |

* cited by examiner

SEALING SYSTEMS FOR GAS TURBINE ENGINE VANE PLATFORMS

CROSS REFERENCE TO RELATED APPLICATIONS

This application claims the benefit of U.S. Provisional Patent Application Ser. No. 62/072,706 filed Oct. 30, 2014, the entire contents of which are incorporated herein by reference thereto.

BACKGROUND OF THE DISCLOSURE

1. Field of the Disclosure

The present disclosure relates to turbomachine components, more specifically sealing interfaces between turbomachine components.

2. Description of Related Art

Traditionally, turbomachines include a sealing system having turbomachine components, for example, vane platforms, and an annular seal. The annular seal and the related components are nominally machined to be concentric about the turbomachine centerline in a cold state. Due to thermal expansion, circumferentially segmented components tend to increase in radius of curvature, so they are no longer concentric about the turbomachine centerline with the annular seal in a hot state. This can potentially lead to segmented components having raised edges tending to cause point loading at the interface between the segmented components and the annular seal. This point loading can result in wear on the annular seal, reducing sealing capability and ultimately its durability.

Such conventional methods and systems have generally been considered satisfactory for their intended purpose. However, there is still a need in the art for improved turbomachine sealing systems.

SUMMARY OF THE DISCLOSURE

A sealing system for a turbomachine includes an annular seal defining a centerline axis and an inner diameter surface. The sealing system also includes a turbomachine component radially inboard of the annular seal having a surface defined on an outer diameter surface. The surface of the turbomachine component has a radius of curvature configured to be non-concentric with respect to the inner diameter surface of the annular seal in a cold state. The radius of curvature of the surface is configured to be substantially concentric with respect to the inner diameter surface of the annular seal in a hot state.

It is contemplated that the annular seal can be a w-ring seal. The radius of curvature of the surface of the turbomachine component can be configured to reduce point contacts on the inner diameter surface of the annular seal between the surface of the turbomachine component and the inner diameter surface of the annular seal. The turbomachine component can be one of a plurality of turbomachine components arranged circumferentially about the centerline axis. The surface of each of the plurality of turbomachine components can have the same radius of curvature. The turbomachine component can be a vane platform, for example.

A vane platform for a turbomachine includes a vane platform body having an inner diameter surface configured to interface with a vane tip, and an outer diameter surface having a forward surface and an aft surface. Each of the forward and aft surfaces have smaller respective radii of curvature in a cold state than in a hot state. Both of the respective radii of curvature in the cold state are configured to be non-concentric with respective surfaces. Both of the respective radii of curvature in the hot state are configured to be substantially concentric with the respective surfaces for reducing point contacts between the forward and aft surfaces and the respective surfaces.

The forward and aft surfaces can have the same radius of curvature. The vane platform body can be one of a plurality of vane platform bodies arranged circumferentially about a centerline axis. The forward and aft surfaces of each of the plurality of vane platform bodies can have the same respective radii of curvature.

A method for manufacturing a turbomachine includes machining a surface of a turbomachine component with a first radius of curvature in a cold state and a second radius of curvature in a hot state. The first radius of curvature is smaller than the second radius of curvature, and the surface of the turbomachine component is configured to face an inner diameter surface of a seal having a radius substantially concentric with the second radius of curvature. The method for manufacturing a turbomachine includes assembling the turbomachine component in a cold state such that the distance from the surface to a turbomachine centerline axis is greater than the first radius of curvature.

The turbomachine component can be a vane platform having an inner diameter surface and an outer diameter surface, wherein the surface is defined on the outer diameter surface of the vane platform. Machining the surface can include machining the surface of the vane platform based on the predicted deflections of a vane. The method can also include machining a second surface in the turbomachine component aft of the surface, wherein the second surface can have a first radius of curvature in a cold state and a second radius of curvature in a hot state, and the first radius of curvature can be smaller than the second radius of curvature. The second surface of the turbomachine component can be configured to face with an inner diameter surface of a seal that is concentric with the second radius of curvature.

In one embodiment, a sealing system for a turbomachine is provided. The sealing system having: an annular seal defining a centerline axis and having an inner diameter surface; and a turbomachine component radially inboard of the annular seal and having a surface inboard of the inner diameter surface of the annular seal, wherein the surface of the turbomachine component has a radius of curvature configured to be non-concentric with respect to the inner diameter surface of the annular seal in a cold state, and wherein the radius of curvature is configured to be substantially concentric with respect to the inner diameter surface of the annular seal in a hot state.

In addition to one or more of the features described above, or as an alternative to any of the foregoing embodiments, the radius of curvature of the surface of the turbomachine component may be configured to reduce point contacts on the inner diameter surface of the annular seal between the surface of the turbomachine component and the inner diameter surface of the annular seal.

In addition to one or more of the features described above, or as an alternative to any of the foregoing embodiments, the annular seal may be a w-ring seal.

In addition to one or more of the features described above, or as an alternative to any of the foregoing embodiments, the turbomachine component may be one of a plurality of turbomachine components arranged circumferentially about the centerline axis, wherein the surface of each of the plurality of turbomachine components has the same radius of curvature.

In addition to one or more of the features described above, or as an alternative to any of the foregoing embodiments, the turbomachine component may be a vane platform.

In yet another embodiment, a vane platform for a turbomachine is provided. The vane platform having: a vane platform body including: an inner diameter surface configured to interface with a vane tip; and an outer diameter surface having a forward surface and an aft surface, wherein each of the forward and aft surfaces have smaller respective radii of curvature in a cold state than in a hot state, wherein both of the respective radii of curvature in the cold state are configured to be non-concentric with respective surfaces, wherein both of the respective radii of curvature in the hot state are configured to be substantially concentric with the respective surfaces for reducing point contacts between the forward and aft surfaces and the respective surfaces.

In addition to one or more of the features described above, or as an alternative to any of the foregoing embodiments, the vane platform body may be one of a plurality of vane platform bodies arranged circumferentially about a centerline axis, wherein the forward and aft surfaces of each of the plurality of vane platform bodies have the same respective radii of curvature.

In addition to one or more of the features described above, or as an alternative to any of the foregoing embodiments, the forward and aft surfaces may have the same radius of curvature.

In yet another embodiment, a method for manufacturing a turbomachine is provided. The method including the steps of: machining a surface of a turbomachine component with a first radius of curvature in a cold state and a second radius of curvature in a hot state, wherein the first radius of curvature is smaller than the second radius of curvature, and wherein the surface of the turbomachine component is configured to face an inner diameter surface of a seal having a radius substantially concentric with the second radius of curvature; and assembling the turbomachine component in a cold state such that the distance from the surface to a turbomachine centerline axis is greater than the first radius of curvature.

In addition to one or more of the features described above, or as an alternative to any of the foregoing embodiments, the turbomachine component may be a vane platform having an inner diameter surface and an outer diameter surface, wherein the surface of the turbomachine component is defined on the outer diameter surface of the vane platform.

In addition to one or more of the features described above, or as an alternative to any of the foregoing embodiments, the machining the surface further includes machining the surface of the vane platform based on the predicted deflections of a vane.

In addition to one or more of the features described above, or as an alternative to any of the foregoing embodiments, further embodiments may include the step of machining a second surface in the turbomachine component aft of the surface, wherein the second surface has a first radius of curvature in a cold state and a second radius of curvature in a hot state, wherein the first radius of curvature is smaller than the second radius of curvature, and wherein the second surface of the turbomachine component is configured to face an inner diameter surface of a seal that is substantially concentric with the second radius of curvature.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
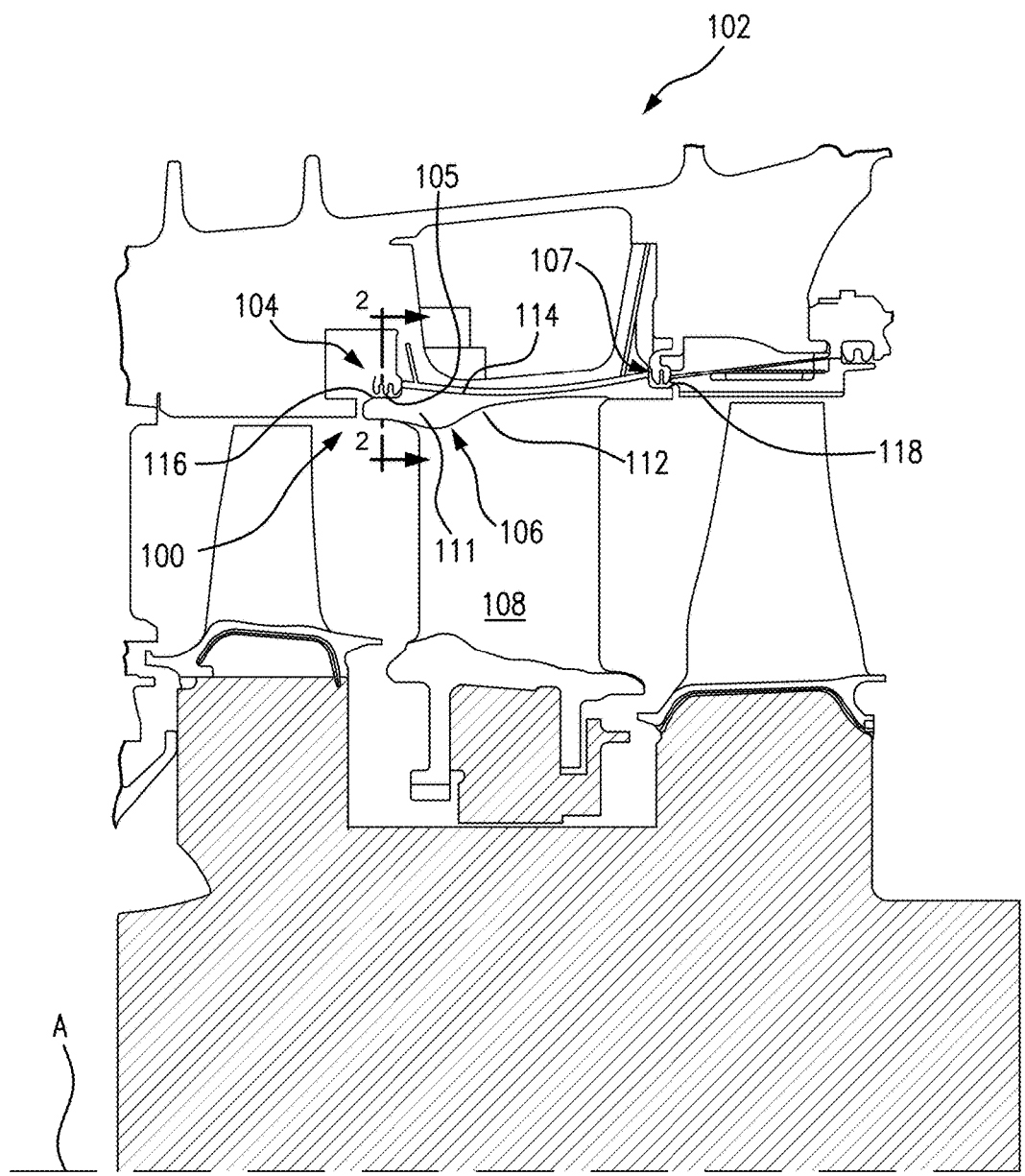
FIG. 1 is a schematic cross-sectional side elevation view of a portion of a gas turbine engine constructed in accordance with an embodiment, showing a vane platform and W-seal.
Figure 2:
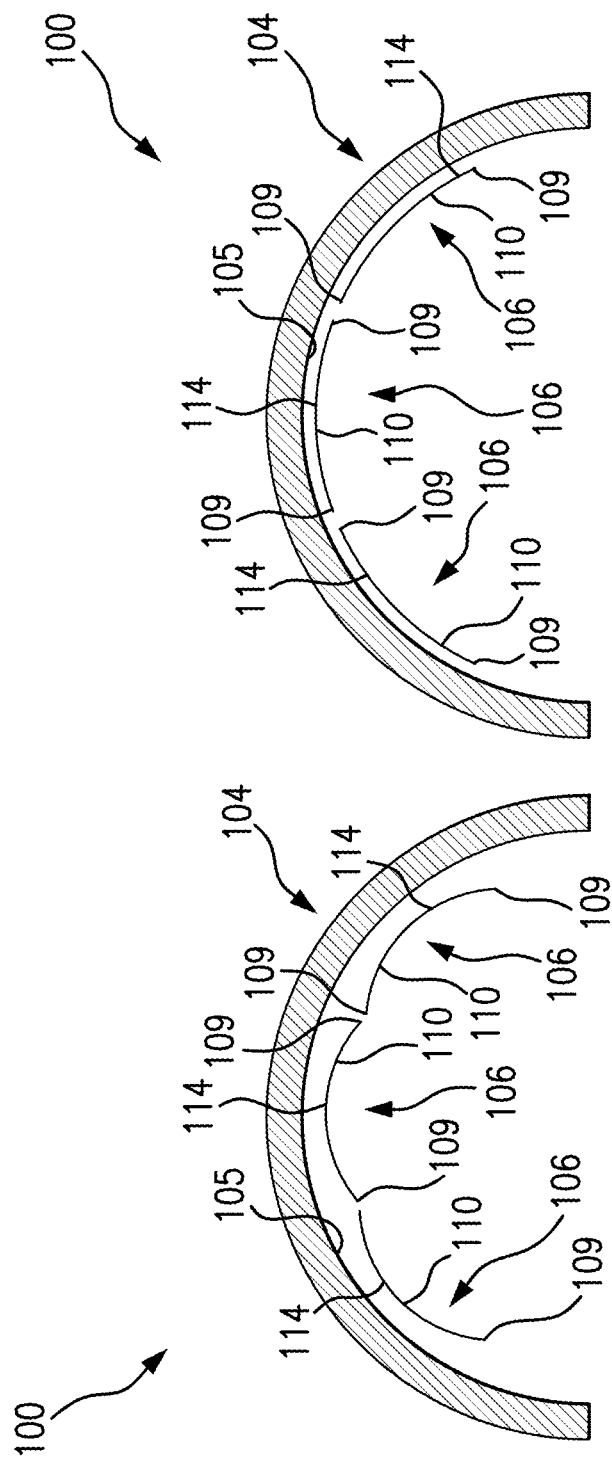
FIG. 2A is a schematic cross-sectional end view of the gas turbine engine of FIG. 1 along lines 2-2 showing the gas turbine in a cold state, according to an embodiment.
FIG. 2B is a schematic cross-sectional end view of the gas turbine engine of FIG. 1 along lines 2-2 showing the gas turbine in a hot state, according to an embodiment.

Reference will now be made to the drawings wherein like reference numerals identify similar structural features or aspects of the subject disclosure. For purposes of explanation and illustration, and not limitation, a partial view of an exemplary embodiment of the system and method for non-concentric sealing surfaces or surfaces in accordance with the disclosure is shown in FIG. 1 and is designated generally by reference character 100. Some other embodiments of systems and method in accordance with the disclosure, or aspects thereof, are provided in FIGS. 2-3, as will be described.

As shown in FIG. 1, a sealing system 100 for a gas turbine engine 102 includes an annular seal 104, e.g. a w-ring seal, defining a centerline axis A. Sealing system 100 also includes a turbomachine component 106, e.g. a non-rotating turbomachine component such as a vane platform, radially inboard of annular seal 104. A vane 108 is disposed radially inboard of vane platform 106. Annular seal 104 defines an inner diameter sealing surface or surface 105. Vane platform 106 defines a vane platform body 111. Vane platform body 111 includes an inner diameter surface 110, shown in FIG. 2, configured to interface with a vane tip 112. Vane platform body 111 also includes an outer diameter surface 114, or outer diameter sealing surface. While embodiments of sealing system 100 are described herein with respect to a gas turbine engine 102, those skilled in the art will readily appreciate that embodiments of sealing system 100 can be used in a variety of turbomachines and in a variety of locations throughout a turbomachine.

As shown in FIGS. 2A and 2B, a plurality of segmented turbomachine components 106, e.g. vane platforms, are arranged circumferentially about centerline axis A. Sealing surface or surface 114 of each vane platform 106 has a smaller radius of curvature in a cold state, shown in FIG. 2A, than in a hot state, shown in FIG. 2B. The radius of curvature of each sealing surface or surface 114 in the hot state is concentric with inner diameter sealing surface or inner surface or surface 105 of annular seal 104 for reducing point contacts on inner diameter sealing surface or inner surface or surface 105 of annular seal 104 at the interface or positioning of sealing surface or surface 114 of vane platform 106 with respect to inner diameter sealing surface or surface 105 of annular seal 104. Sealing surfaces or surfaces 114 of each turbomachine component 106 have substantially the same radius of curvature. As each sealing surface or surface 114 heats from a cold state to a hot state and thermally deflects, the combined sealing surfaces or surfaces 114 approximate a uniform circle concentric with the inner diameter sealing surface or surface 105 of annular seal 104. This provides an even and continuous loading on a smooth surface, resulting in an evenly distributed load on annular seal 104 and reduced point contacts between circumferential ends 109 of each turbomachine component 106 and the inner diameter surface or surface 105 of annular seal 104, as compared to traditional sealing systems. This improves the sealing capability and durability of annular seal 104, as compared with traditional sealing systems.

With reference now to FIG. 1, sealing surface or surface 114 includes a forward sealing surface or forward surface 116 and an aft sealing surface or aft surface 118. Each of forward and aft sealing surfaces or surfaces, 116 and 118, respectively, have radii of curvature similar to sealing surface or surface 114. Those having skill in the art will readily appreciate that forward and aft sealing surfaces or surface, 116 and 118, respectively, may not have the same radius of curvature as one another, in either a cold state or a hot state, as they interface with different annular seals. For example, aft sealing surface 118 interfaces with an aft annular seal 107, e.g. a w-ring seal.

Figure 3:
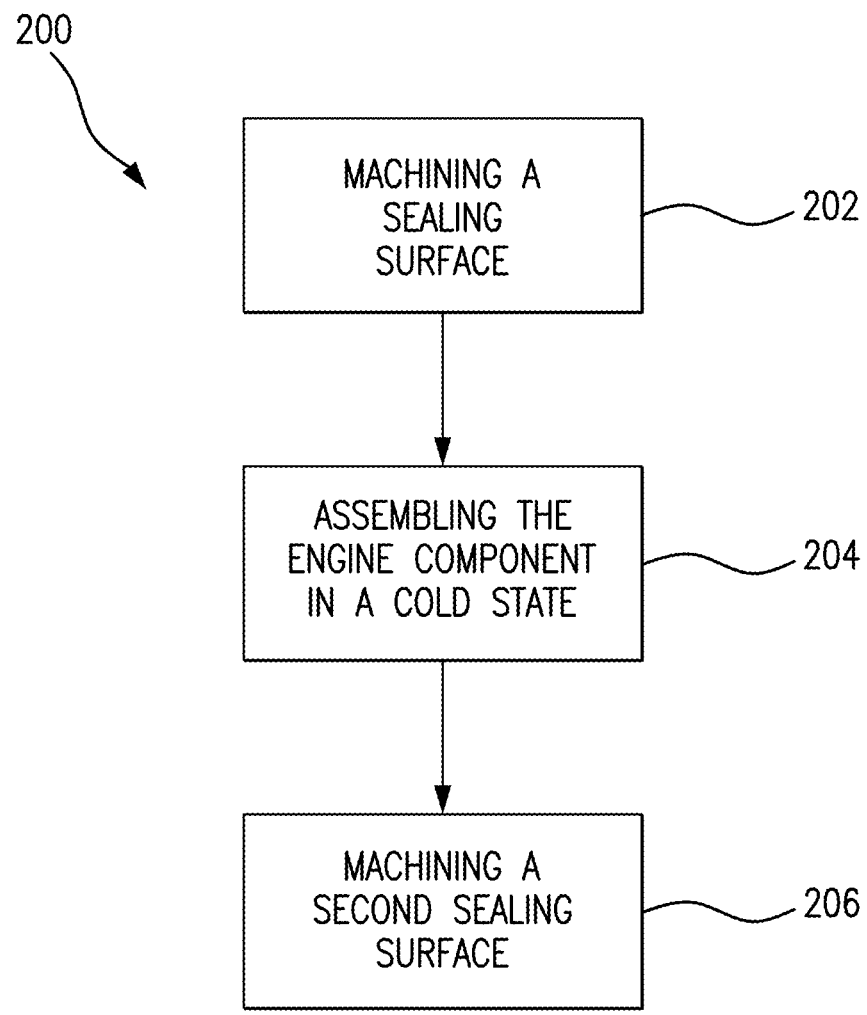
FIG. 3 is a flow-chart diagram of an embodiment of a method for manufacturing a turbomachine, showing a process for machining a sealing surface.

As shown in FIG. 3, a method 200 for manufacturing a turbomachine includes operations 202, 204, 206. Operation 202 includes machining a sealing surface or surface, e.g. sealing surface or surface 114 or forward sealing surface or surface 116, of a turbomachine component, e.g. turbomachine component 106, having a first radius of curvature in a cold state and a second radius of curvature in a hot state, similar to the radii of curvature described above. Sealing surface or surface 114 can be machined to a smaller radius of curvature based on the predicted deflections of the vane or other surrounding components and can vary as needed for a given application.

Operation 204 includes assembling the turbomachine component in a cold state such that the distance from the sealing surface or surface to a turbomachine centerline axis, e.g. centerline axis A, is greater than the first radius of curvature. Operation 206 includes machining a second sealing surface or surface, e.g. aft sealing surface or aft surface 118, in the turbomachine component aft of the sealing surface or surface, wherein the second sealing surface or surface has a first radius of curvature in a cold state and a second radius of curvature in a hot state, similar to the radii of curvature described above.

The methods and systems of the present disclosure, as described above and shown in the drawings, provide for sealing surfaces or surfaces with superior properties including reduced seal wear due to stress at point contacts. While the apparatus and methods of the subject disclosure have been shown and described with reference to embodiments, those skilled in the art will readily appreciate that changes and/or modifications may be made thereto without departing from the scope of the subject disclosure.

What is claimed is:

1. A sealing system for a turbomachine, comprising:
a first annular seal defining a centerline axis and having an inner diameter surface;
a second annular seal and having an inner diameter surface, wherein at least one of the first annular seal and the second annular seal is a w-ring seal; and
a turbomachine component radially inboard of the first annular seal and the second annular seal, the turbomachine component having a forward surface and an aft surface, the forward surface inboard of the inner diameter surface of the first annular seal, wherein the forward surface of the turbomachine component has a first radius of curvature configured to be non-concentric with respect to the inner diameter surface of the first annular seal in a cold state, and wherein the first radius of curvature is configured to be substantially concentric with respect to the inner diameter surface of the first annular seal in a hot state, the aft surface inboard of the inner diameter surface of the second annular seal, wherein the aft surface of the turbomachine component has a second radius of curvature configured to be non-concentric with respect to the inner diameter surface of the second annular seal in the cold state, and wherein the second radius of curvature is configured to be substantially concentric with respect to the inner diameter surface of the second annular seal in the hot state, the first radius and the second radius being different from each other.

2. A sealing system as recited in claim 1, wherein the radius of curvature of the surface of the turbomachine component is configured to reduce point contacts on the inner diameter surface of the annular seal between the surface of the turbomachine component and the inner diameter surface of the annular seal.

3. A sealing system as recited in claim 1, wherein the turbomachine component is one of a plurality of turbomachine components arranged circumferentially about the centerline axis, wherein the surface of each of the plurality of turbomachine components has the same radius of curvature.

4. A sealing system as recited in claim 1, wherein the turbomachine component is a vane platform.

* * * * *